Jan. 26, 1960     J. WORDSWORTH ET AL     2,922,636
PISTON AND CYLINDER ARRANGEMENTS
Filed Dec. 15, 1958
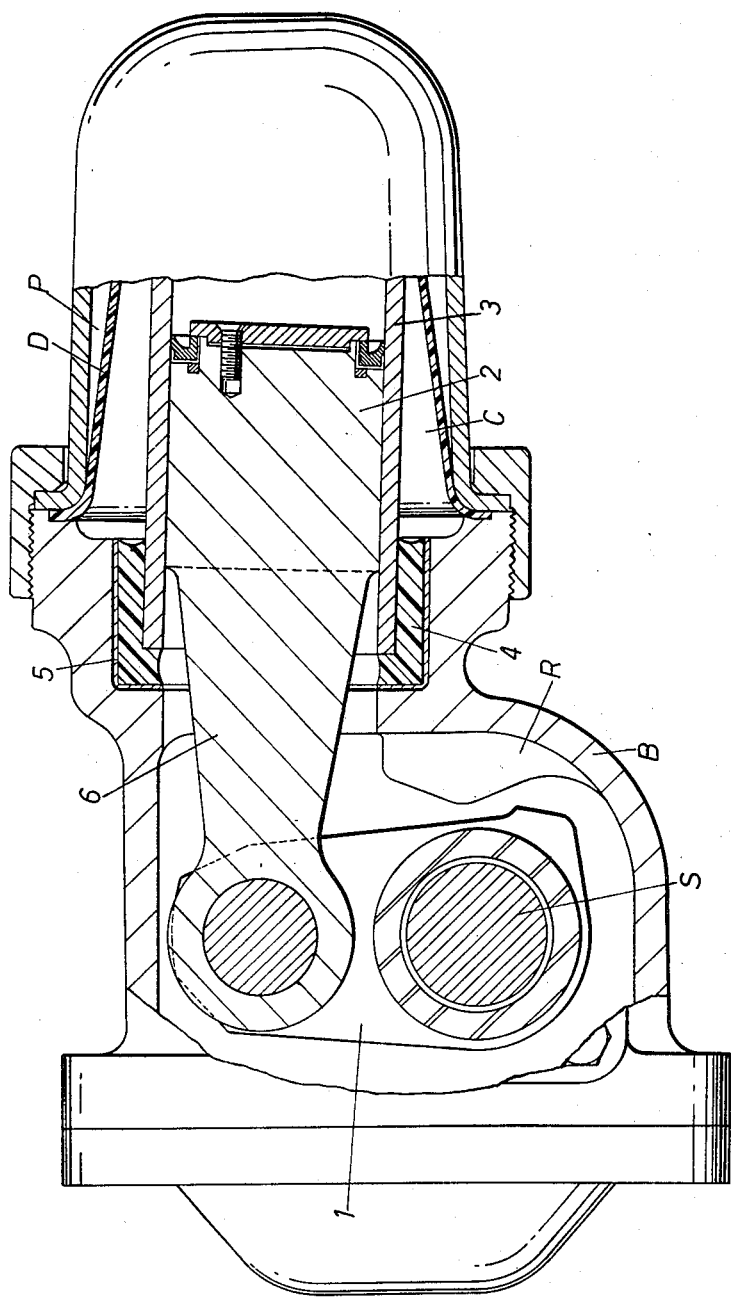
Inventors
Jack Wordsworth,
John Stanley Eckersley
By
Mead, Browne, Schuyler & Beveridge
Attorneys 2,922,636

PISTON AND CYLINDER ARRANGEMENTS

Jack Wordsworth, York, and John Stanley Eckersley, Thornbury, Bradford, England, assignors to Armstrong Patents Co. Limited, Beverley, Yorkshire, England, a British company Application December 15, 1958, Serial No. 780,493

Claims priority, application Great Britain December 14, 1957

2 Claims. (Cl. 267—15)

This invention concerns piston and cylinder arrangements, and relates especially to piston and cylinder arrangements for use in hydraulic apparatus such as vehicle shock absorbers.

One widely used form of vehicle shock absorber employs a piston adapted to reciprocate, in dependence upon vehicle riding movements, in a pressure cylinder containing a hydraulic medium which, by way of valves in the piston and pressure cylinder, is adapted to exhaust to or to be drawn from a reservoir external to the pressure cylinder. In another, more recently developed construction of shock absorber, described in patent application No. 691,396 a piston likewise displaceable responsive to vehicle riding movements, is reciprocable in a cylinder to exert varying degrees of pressure on a hydraulic medium in a confined space outside the cylinder, and defined by a flexible diaphragm enclosing said cylinder, there being in turn outside said diaphragm, an enclosed space containing compressed air which acts as a pneumatic spring.

In both the above described and in various other shock absorber constructions employing piston and cylinder arrangements, the piston is usually connected by way of a piston rod to some convenient vehicle part which is subjected to riding movements. As a result, the piston and piston rod are required to be accurately aligned with respect to the cylinder in the shock absorber, or alternatively, especially where the vehicle riding movements are transmitted to the piston by way of a semi-rotary or rockable shaft and a crank, as in the construction described in Patent Application No. 691,396 a ball-ended or other suitable pivotal connection is provided between the piston and the piston rod.

It is an object of the invention to simplify the assembly of and to eliminate the need for accurate alignment in piston and cylinder arrangements of hydraulic apparatus, especially for such arrangements in vehicle shock absorbers.

According to the present invention, in hydraulic apparatus wherein a piston is reciprocable in a cylinder, the cylinder is mounted within said apparatus at one of its ends only, and said cylinder end is received within a flexible member which is in turn fixedly secured to a convenient portion of said apparatus, whereby during piston movement the cylinder is enabled to flex within its mounting in order to prevent relative misalignments between said cylinder and said piston.

The ability of the cylinder to flex in the manner proposed by the invention also eliminates any requirement for a pivotal connection between the piston and an associated piston rod, which may therefore together comprise a unitary construction.

Preferably the flexible member in which the cylinder is mounted is a rubber or the like elastomeric bush, but other resilient bushes or mountings may be employed.

The invention will be described further by way of example, with reference to the accompanying drawing, in which the single figure is a side elevation, partly in vertical longitudinal section, of a combined pneumatic spring and hydraulic shock absorber having the invention applied thereto.

The combined spring and shock absorber shown in the drawing is generally of the same construction as that described in patent application No. 691,396. It will be seen to comprise a semi-rotary or rockable shaft S to which vehicle riding movements are imparted, this shaft S being housed within a low pressure chamber R in the body B of the unit. The low pressure chamber R is at least partly filled with hydraulic medium. The semi-rotary shaft S is connected by way of a crank 1 to a piston 2 which is arranged to be displaceable, responsive to the vehicle riding movements, within the cylinder 3. The end of the cylinder 3 remote from the low pressure chamber R (that is to say the outer end of the cylinder regarded in relation to the piston movement) is enclosed by a flexible diaphragm D which defines between itself and the cylinder 3, a confined space C containing hydraulic medium upon which varying loads are exerted by the piston, in dependence upon piston displacement. Outside the flexible diaphragm D there is a pneumatic chamber P containing compressed air which supports the load exerted on the diaphragm D by the hydraulic medium in the confined space C and hence acts as a pneumatic spring.

In accordance with the invention, the inner end of the cylinder 3 is mounted flexibly in relation to the body B. For this purpose the inner end of the cylinder 3 is received within a rubber bush 4 which is in turn housed within a suitable annular recess formed in the body B. The rubber bush may in turn be peripherally bonded to a metal or the like substantially rigid shell 5 which serves to retain it securely in the annular recess in the body B. Thus, as the piston reciprocates within the cylinder any misalignment due to variation in manufacturing tolerances or arising from other causes, is taken up by the ability of the cylinder to flex within the rubber bush 4. Flexible mounting of the cylinder 3 as described also enables the piston 2 to be formed as a unitary structure with its piston rod 6 by which it is connected to the crank 1.

Although the rubber bush 4 has been shown as having at one end, an inwardly directed peripheral flange against which the inner end of the cylinder 3 seats, it will be appreciated that if desired such flange may be omitted and the bush simply comprise a plain cylinder. Alternatively, instead of being of conventional cylindrical section, the bush may be of tapering section, that is to say may be externally frusto-conical.

We claim:

1. A combined vehicle suspension and shock absorber unit comprising a hollow body member, said body member having a wall formed with an annular recess, a flexible annular bush fixedly secured within said recess, a hydraulic cylinder secured at one end in said recess, the opposite end of said cylinder being free, said hydraulic cylinder extending from said body member and communicating with the hollow interior of said body member, a rockable shaft located within the hollow interior of said body member, a piston located within and displaceable within said cylinder, a piston rod extending from said piston towards said shaft, said piston rod constituting a unitary structure with said piston, means pivotally connecting said piston rod to said shaft, said connecting means being operable to displace said piston within said cylinder responsive to turning movement of said shaft, an elastic diaphragm secured to said body member and enclosing the end of said cylinder which is remote from said flexible bush, said flexible diaphragm defining in part a reservoir for a hydraulic shock absorbing medium, said piston being operable to cause flow of said medium between the reservoir and the cylinder in response to displacement of said piston, and means located exteriorly of said diaphragm and defining together with said diaphragm a pneumatic chamber adapted to contain a pneumatic medium and thus constitute a pneumatic suspension.

2. In hydraulic apparatus having a body member presenting a cylinder and a piston reciprocable within said cylinder, a flexible annular bush fixedly secured in said body member and supporting one end only of said cylinder, the opposite end of said cylinder being free, a rockable shaft journalled in said body member, a piston rod integral with said piston, and means connecting said shaft with said piston rod, said connecting means being operable to displace said piston within said cylinder responsive to turning movement of said shaft, and said flexible bush enabling said cylinder to flex during said piston displacement in order to prevent relative misalignments between said piston and said cylinder.

References Cited in the file of this patent

UNITED STATES PATENTS

| 2,858,143 | Prichard et al. | Oct. 28, 1958 |
| 2,865,651 | Chayne et al. | Dec. 23, 1958 |

FOREIGN PATENTS

| 779,597 | Great Britain | July 24, 1957 |